United States Patent
Taira

(10) Patent No.: US 10,545,479 B2
(45) Date of Patent: Jan. 28, 2020

(54) CONTROLLER, CONTROL METHOD, AND CONTROL PROGRAM

(71) Applicant: FANUC CORPORATION, Yamanashi (JP)

(72) Inventor: Ryousuke Taira, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/268,946

(22) Filed: Feb. 6, 2019

(65) Prior Publication Data

US 2019/0286093 A1 Sep. 19, 2019

(30) Foreign Application Priority Data

Mar. 13, 2018 (JP) .................. 2018-045730

(51) Int. Cl.
*G05B 19/18* (2006.01)
*G05B 19/19* (2006.01)
*G05B 19/409* (2006.01)
*G06F 3/0484* (2013.01)
*G06F 3/0488* (2013.01)
*G06F 3/0481* (2013.01)

(52) U.S. Cl.
CPC ......... *G05B 19/195* (2013.01); *G05B 19/182* (2013.01); *G05B 19/409* (2013.01); *G06F 3/04817* (2013.01); *G06F 3/04842* (2013.01); *G06F 3/04847* (2013.01); *G06F 3/04886* (2013.01); *G05B 2219/34015* (2013.01); *G05B 2219/36168* (2013.01)

(58) Field of Classification Search
CPC ............................ G05B 19/195; G05B 19/182

USPC ........................................................ 318/569
See application file for complete search history.

(56) References Cited

U.S. PATENT DOCUMENTS

| 2015/0246406 | A1* | 9/2015 | Takayama | ............... B23K 9/173 |
| | | | | 219/124.1 |
| 2015/0292863 | A1* | 10/2015 | Furihata | .................... G01J 9/00 |
| | | | | 348/135 |
| 2018/0211138 | A1* | 7/2018 | Yamada | ............... G06K 9/6256 |
| 2019/0262709 | A1* | 8/2019 | Nakamura | ............ A63F 13/428 |

FOREIGN PATENT DOCUMENTS

JP 2016-157400 9/2016

* cited by examiner

*Primary Examiner* — Erick D Glass
(74) *Attorney, Agent, or Firm* — Wenderoth, Lind & Ponack, L.L.P.

(57) ABSTRACT

A numerical controller includes a movement plane acquisition unit configured to accept designation of a movement plane in a machine coordinate system, a machine coordinate conversion unit configured to convert a coordinate value in the machine coordinate system into an image coordinate system, an image coordinate conversion unit configured to convert a coordinate value in the image coordinate system into the machine coordinate system, an operation target position acquisition unit configured to acquire position information on an operation target, an operation icon display unit configured to display an operation icon corresponding to the position information, a slide position acquisition unit configured to acquire a slide position, a movement amount calculation unit configured to calculate an axial movement amount, and an axial movement unit configured to move the operation target according to the axial movement amount.

12 Claims, 7 Drawing Sheets

FIG. 3
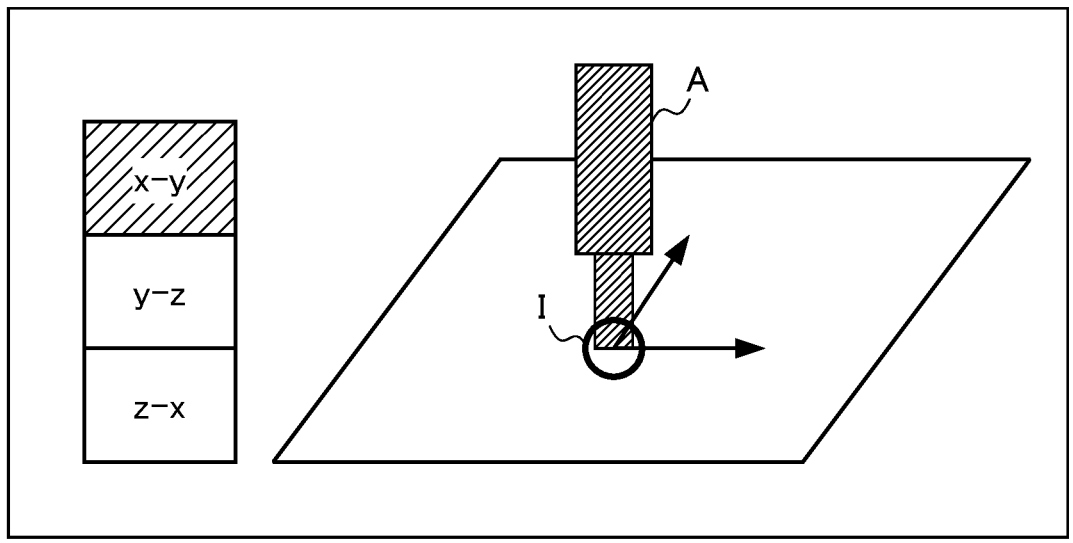
X-Y PLANE
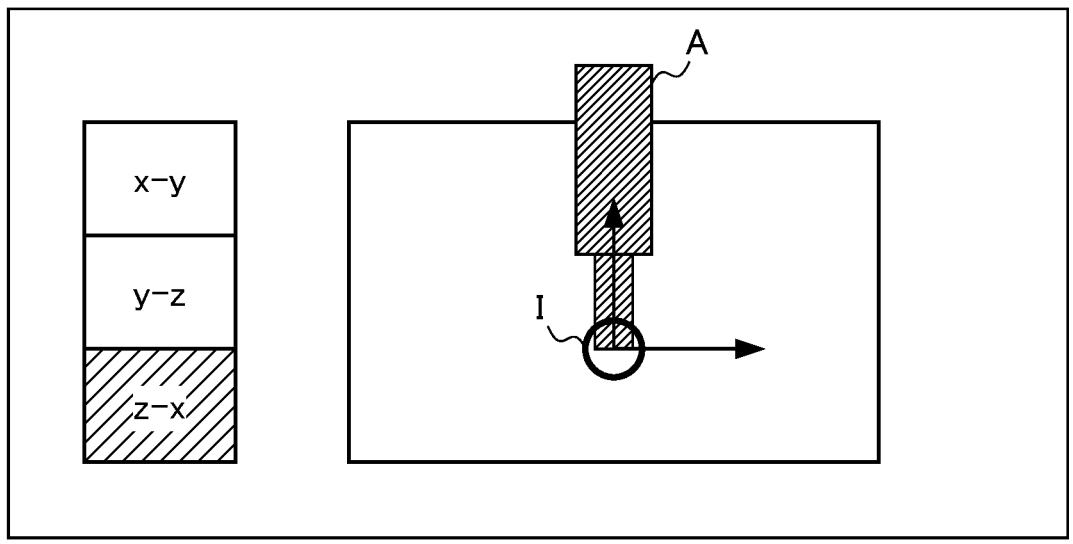
Z-X PLANE

| OPERATION TARGET AXIS | MOVEMENT AXIS | ROTATION ANGLE |
|---|---|---|
| x | ☑ | 30° |
| y | ☑ | 0° |
| z | ☐ | 0° |

CONTROLLER, CONTROL METHOD, AND CONTROL PROGRAM

This application is based on and claims the benefit of priority from Japanese Patent Application No. 2018-045730, filed on 13 Mar. 2018, the content of which is incorporated herein by reference.

BACKGROUND OF THE INVENTION

Field of the Invention

The present invention relates to a controller for a machine tool, a control method therefor, and a control program therefor.

Related Art

As conventional means to manually move axes of a machine tool, an operator performs manual continuous feed or manual handle feed. In such an axial operation, an operator needs to check alternately the machining area of the machine tool and the screen of a numerical controller. In order to reduce such a burden on the operator, for example, Patent Document 1 proposes a method of moving axes while an operator touches an icon for each axis on a touch panel displaying an image of the machining area.

Patent Document 1: Japanese Unexamined Patent Application, Publication No. 2016-157400

SUMMARY OF THE INVENTION

However, in such a conventional method, each axis needs to be operated individually, and further the icon displayed on the touch panel needs to be continuously depressed until each axis reaches an intended position. In addition, each axis moves only at a preset speed, and thus it is difficult to visually check that each axis is accurately moved to an intended position. Accordingly, this puts a heavy burden on the operator.

The purpose of the present invention is to provide a controller, a control method, and a control program enabling to reduce a burden on an operator when moving axes of a machine tool.

(1) A controller (for example, a numerical controller 1 to be described below) according to the present invention includes a movement plane acquisition unit (for example, a movement plane acquisition unit 111 to be described below) configured to accept designation of a movement plane on which an operation target is to be moved in a three-dimensional machine coordinate system indicating a position in a machining area of a machine tool (for example, a machine tool 2 to be described below), a machine coordinate conversion unit (for example, a machine coordinate conversion unit 112 to be described below) configured to convert a coordinate value in the machine coordinate system into a two-dimensional image coordinate system indicating a position in an image of the machining area imaged by a camera (for example, a camera 3 to be described below), an image coordinate conversion unit (for example, an image coordinate conversion unit 113 to be described below) configured to convert a coordinate value in the image coordinate system into a coordinate value on the movement plane in the machine coordinate system, an operation target position acquisition unit (for example, an operation target position acquisition unit 114 to be described below) configured to acquire current position information on the operation target in the machine coordinate system, an operation icon display unit (for example, an operation icon display unit 115 to be described below) configured to superimpose and display an operation icon at a coordinate in the image coordinate system corresponding to the position information, a slide position acquisition unit (for example, a slide position acquisition unit 116 to be described below) configured to acquire a destination of a slide position in a slide operation after the operation icon is touched by an operator, a movement amount calculation unit (for example, a movement amount calculation unit 117 to be described below) configured to calculate an axial movement amount of the machine tool, on a basis of the coordinate obtained by converting the slide position in the image coordinate system into the machine coordinate system, and an axial movement unit (for example, an axial movement unit 118 to be described below) configured to move the operation target according to the calculated axial movement amount.

(2) In the controller according to (1), the slide position acquisition unit may acquire an end position of the slide operation as the slide position, and the movement amount calculation unit may calculate the axial movement amount of the machine tool required to move the operation target to a coordinate of the end position in the machine coordinate system.

(3) In the controller according to (1), the slide position acquisition unit may periodically acquire the slide positions from a start to an end of the slide operation, and the movement amount calculation unit may acquire in time series the coordinate values of the slide positions converted into the machine coordinate system, and may calculate the axial movement amounts required to move the operation target sequentially along the coordinate values.

(4) In the controller according to (3), the movement amount calculation unit may calculate the axial movement amounts required to move the operation target along a path obtained by interpolating the coordinate values acquired in time series with a curve.

(5) In the controller according to (3) or (4), the slide position acquisition unit may calculate a period of time until the slide operation reaches each of the slide positions, on a basis of a number of the slide positions acquired periodically from the start to the end of the slide operation, and an acquisition cycle of the slide positions designated in advance, and the axial movement unit may move the operation target for a period of time equivalent to the calculated period of time.

(6) In the controller according to any one of (1) to (4), the slide position acquisition unit may acquire a period of time until the slide operation reaches the slide position, and the axial movement unit may move the operation target for a period of time equivalent to the acquired period of time.

(7) In the controller according to (6), the axial movement unit may start to move the operation target after a predetermined time passing after acquisition of the slide position.

(8) In the controller according to any one of (1) to (7), the movement plane acquisition unit may accept selection input of the movement plane from an image illustrating a plurality of preset candidates.

(9) In the controller according to any one of (1) to (7), the movement plane acquisition unit may accept designation of the movement plane, through selection of two axes out of three-dimensional coordinate axes in the machining area and input of a rotation angle around each axis of a plane determined by the two selected axes.

(10) In the controller according to any one of (1) to (9), the slide position acquisition unit may display the coordinate value obtained by converting the slide position in the image coordinate system into the machine coordinate system, according to the slide operation.

(11) A control method according to the present invention to be executed by a computer (for example, a CPU 11 to be described below) includes a movement plane acquiring step of accepting designation of a movement plane on which an operation target is to be moved in a three-dimensional machine coordinate system indicating a position in a machining area of a machine tool (for example, a machine tool 2 to be described below), a machine coordinate converting step of converting a coordinate value in the machine coordinate system into a two-dimensional image coordinate system indicating a position in an image of the machining area imaged by a camera (for example, a camera 3 to be described below), an image coordinate converting step of converting a coordinate value in the image coordinate system into a coordinate value on the movement plane in the machine coordinate system, an operation target position acquiring step of acquiring current position information on the operation target in the machine coordinate system, an operation icon displaying step of superimposing and displaying an operation icon at a coordinate in the image coordinate system corresponding to the position information, a slide position acquiring step of acquiring a destination of a slide position in a slide operation after the operation icon is touched by an operator, a movement amount calculating step of calculating an axial movement amount of the machine tool, on a basis of the coordinate obtained by converting the slide position in the image coordinate system into the machine coordinate system, and an axis moving step of moving the operation target according to the calculated axial movement amount.

(12) A control program according to the present invention makes a computer (for example, a CPU 11 to be described below) execute the steps of a movement plane acquiring step of accepting designation of a movement plane on which an operation target is to be moved in a three-dimensional machine coordinate system indicating a position in a machining area of a machine tool (for example, a machine tool 2 to be described below), a machine coordinate converting step of converting a coordinate value in the machine coordinate system into a two-dimensional image coordinate system indicating a position in an image of the machining area imaged by a camera (for example, a camera 3 to be described below), an image coordinate converting step of converting a coordinate value in the image coordinate system into a coordinate value on the movement plane in the machine coordinate system, an operation target position acquiring step of acquiring current position information on the operation target in the machine coordinate system, an operation icon displaying step of superimposing and displaying an operation icon at a coordinate in the image coordinate system corresponding to the position information, a slide position acquiring step of acquiring a destination of a slide position in a slide operation after the operation icon is touched by an operator, a movement amount calculating step of calculating an axial movement amount of the machine tool, on a basis of the coordinate obtained by converting the slide position in the image coordinate system into the machine coordinate system, and an axis moving step of moving the operation target according to the calculated axial movement amount.

The present invention reduces a burden on an operator when moving axes of a machine tool.

BRIEF DESCRIPTION OF THE DRAWINGS

FIG. 3 is a diagram illustrating an example of a method (A) of designating a movement plane according to the first embodiment.

DETAILED DESCRIPTION OF THE INVENTION

First Embodiment

The first embodiment of the present invention will be described below. Although a numerical controller 1 in which various types of functions to be described below are newly mounted serves as a controller for a machine tool in the present embodiment, an information processing unit having an interface between the information processing unit and an existing numerical controller may serve as a controller.

Figure 1:
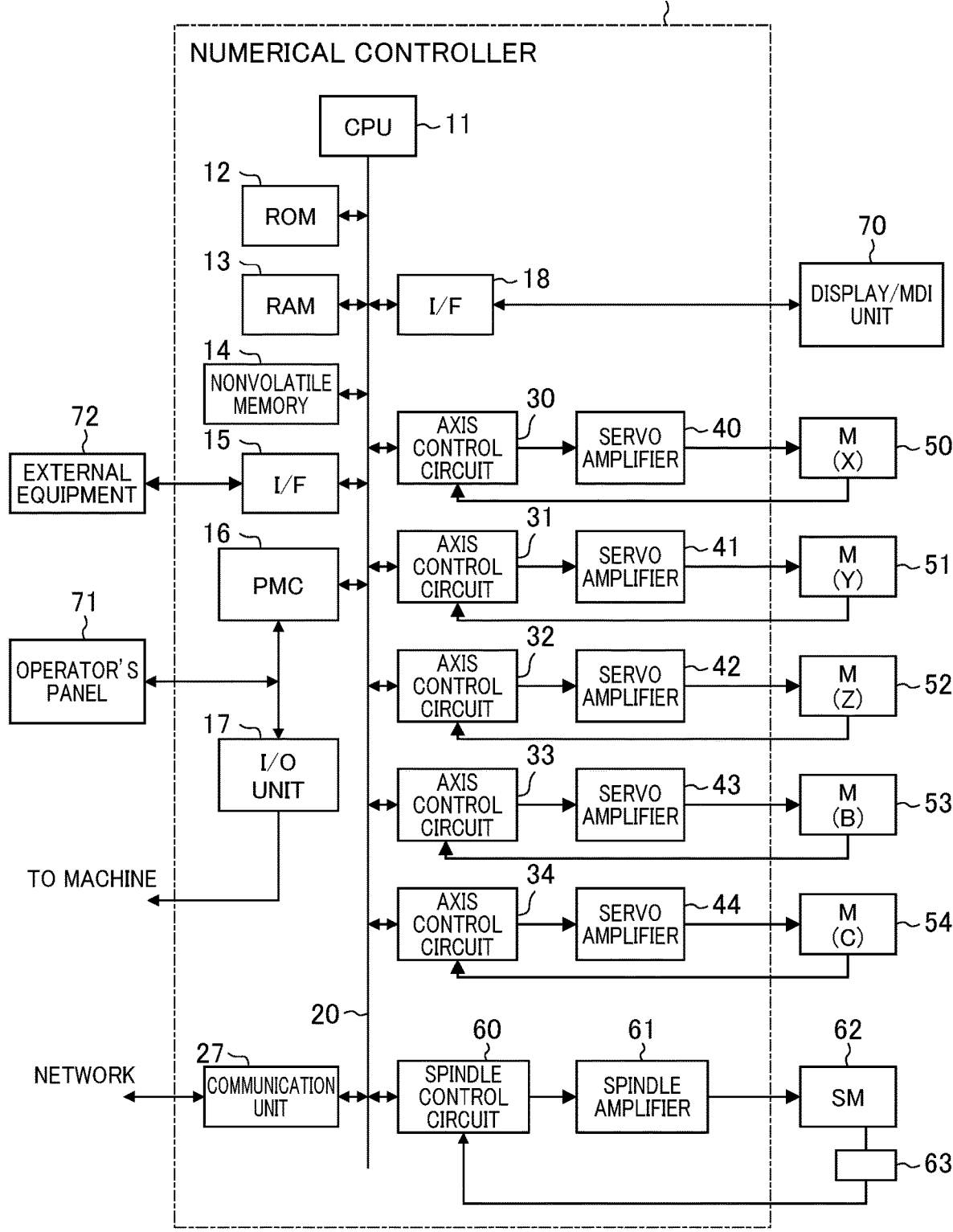
FIG. 1 is a block diagram illustrating hardware configurations of principal portions of a numerical controller according to a first embodiment.

FIG. 1 is a block diagram illustrating the hardware configurations of principal portions of the numerical controller 1 according to the present embodiment. The numerical controller 1 includes a CPU 11 as a processor that controls the entire numerical controller 1. The CPU 11 reads a system program stored in a ROM 12 through a bus 20 and controls the entire numerical controller 1 by following the read system program. A RAM 13 stores temporary calculated data, display data, and various types of data input by an operator through a display/MDI unit 70. Generally, access is made faster to a RAM than to a ROM. Thus, the CPU 11 may deploy the system program stored in the ROM 12 in advance on the RAM 13. Then, the CPU 11 may read the system program from the RAM 13 and execute the read system program. A nonvolatile memory 14 is a magnetic storage unit, a flash memory, an MRAM, FRAM, or an EEPROM, for example. Alternatively, the nonvolatile memory 14 is an SRAM or a DRAM backed up by a battery, for example. The nonvolatile memory 14 is configured as a nonvolatile memory to hold its storage state even after the numerical controller 1 is powered off. The nonvolatile memory 14 stores a machining program, etc. input through an interface 15, the display/MDI unit 70, or a communication unit 27.

The ROM 12 stores various system programs written in advance for executing processing in an edit mode required for generation and editing of a machining program and for executing processing for automatic operation. Various machining programs are input through the interface 15, the display/MDI unit 70, or the communication unit 27, and are stored into the nonvolatile memory 14. The interface 15 connects between the numerical controller 1 and external equipment 72. A machining program, various parameters, etc., are read from the external equipment 72 into the numerical controller 1. The machining program edited in the numerical controller 1 can be stored into an external storage through the external equipment 72. Specific examples of the interface 15 include an RS232C interface, a USB, an SATA interface, a PC card slot, a CF card slot, an SD card slot, Ethernet, and Wi-Fi. The interface 15 can be located on the display/MDI unit 70. Examples of the external equipment 72 include a computer, a USB memory, a CFast card, a CF card, and an SD card.

A programmable machine controller (PMC) 16 outputs a signal through an I/O unit 17 to an auxiliary device (such as an automatic tool change device) of a machine tool to control the auxiliary device by following a sequence program provided in the numerical controller 1. The PMC 16 accepts signals input through various switches, etc. of an operator's panel 71 arranged at the body of the machine tool, executes necessary signal processing, and transfers the processed signals to the CPU 11. Generally, the PMC 16 is also called a programmable logic controller (PLC). The operator's panel 71 is connected to the PMC 16. The operator's panel 71 may include a manual pulse generator, for example. The display/MDI unit 70 is a manual data input unit with a display 701 (display unit) and an operation unit such as a keyboard or a touch panel 702. An interface 18 is used for transmitting screen data to be displayed to the display 701 of the display/MDI unit 70. The interface 18 is also used for receiving a command and data from the operation unit of the display/MDI unit 70 and transferring the received command and data to the CPU 11.

Axis control circuits 30 to 34 of corresponding axes receive movement command amounts of the corresponding axes given from the CPU 11, and output the commands on the corresponding axes to servo amplifiers 40 to 44 respectively. In response to receipt of these commands, the servo amplifiers 40 to 44 drive servo motors 50 to 54 of the corresponding axes respectively. The servo motors 50 to 54 of the corresponding axes each include a built-in position and speed detector. The servo motors 50 to 54 transmit position and speed feedback signals as feedbacks to the axis control circuits 30 to 34 respectively, thereby exerting position and speed feedback control.

A spindle control circuit 60 outputs a spindle speed signal to a spindle amplifier 61 in response to receipt of a spindle rotation command directed to the machine tool. In response to receipt of the spindle speed signal, the spindle amplifier 61 rotates a spindle motor 62 of the machine tool at a rotation speed designated by the command, thereby driving a tool. A pulse encoder 63 is coupled to the spindle motor 62 with a gear or a belt, for example. The pulse encoder 63 outputs a feedback pulse in synchronization with the rotation of a spindle. The feedback pulse passes through the bus 20 to be read by the CPU 11.

Figure 2:
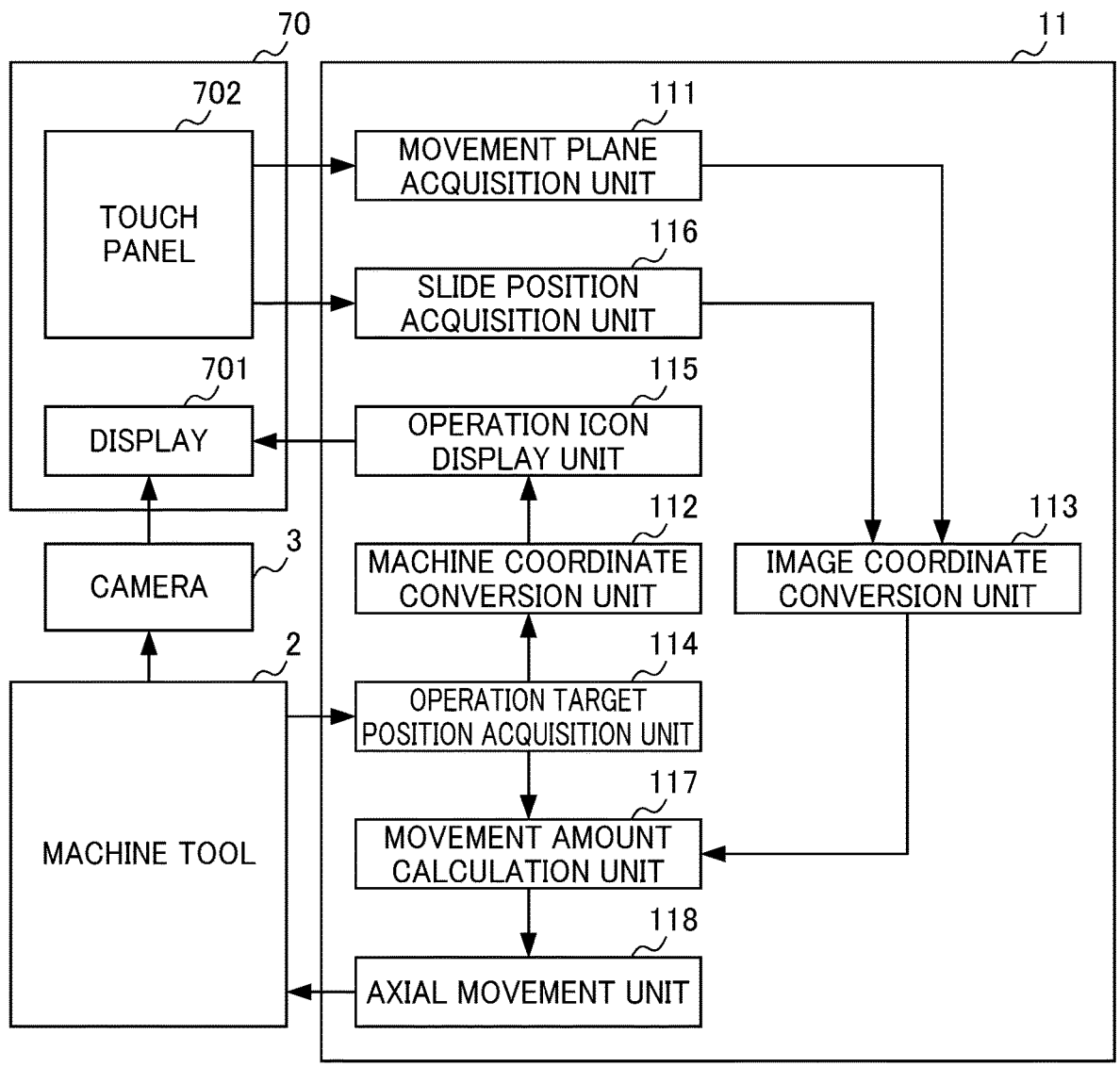
FIG. 2 is a block diagram illustrating functional configurations of a CPU in the numerical controller according to the first embodiment.

FIG. 2 is a block diagram illustrating the functional configurations of the CPU 11 in the numerical controller 1 according to the present embodiment. The CPU 11 includes a movement plane acquisition unit 111, a machine coordinate conversion unit 112, an image coordinate conversion unit 113, an operation target position acquisition unit 114, an operation icon display unit 115, a slide position acquisition unit 116, a movement amount calculation unit 117, and an axial movement unit 118. Each of these functional units is realized when the CPU 11 executes the system program stored in the ROM 12.

The display 701 displays the image of the machining area of a machine tool 2 imaged by a camera 3. It is noted that the camera 3 may be connected to the display 701 via the numerical controller 1, or a video signal may be directly input to the display 701. The display 701 and the touch panel 702 are disposed in the display/MDI unit 70 so as to be superimposed on each other. The coordinate value of a touched position on the display 701 coincide with the coordinate value of the touched position on the touch panel 702.

The movement plane acquisition unit 111 accepts designation of a movement plane on which an operation target is to be moved in a three-dimensional machine coordinate system indicating a position in the machining area of the machine tool 2. The numerical controller 1 accepts via the touch panel 702 an instruction to move an operation target on the movement plane, and performs axial movement of the machine tool 2.

At this time, the movement plane acquisition unit 111 accepts the designation of the movement plane by either one of the following methods (A) and (B), as an example.

Method (A): The movement plane acquisition unit 111 accepts selection input of the movement plane from the image illustrating a plurality of preset candidates. FIG. 3 is a diagram illustrating an example of the method (A) of designating the movement plane according to the present embodiment.

In an example, the movement plane acquisition unit 111 displays three options of an x-y plane, a y-z plane, and a z-x plane, each which is configured with two axes out of three-dimensional coordinate axes x, y, z in the machine coordinate system, as movement plane candidates on the display 701. The movement plane acquisition unit 111 accepts selection input from an operator via the touch panel 702. At this time, the display 701 may display images such as of an operation icon I representing the position of an operation target A, a parallelogram representing the selected movement plane, and arrows representing the directions of respective axes, together with the image of the machining area.

Figure 4:
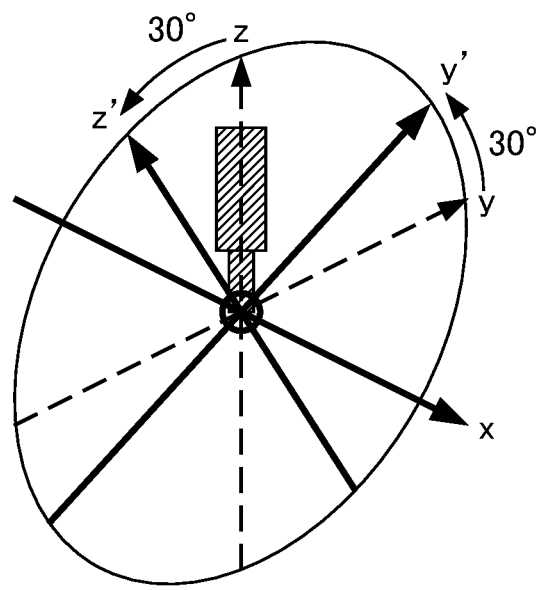
FIG. 4 is a diagram illustrating an example of a method (B) of designating a movement plane according to the first embodiment.

Method (B): The movement plane acquisition unit 111 accepts the designation of the movement plane through selection of two axes out of the three-dimensional coordinate axes x, y, z in the machining area, and input of the rotation angle around each axis of the plane determined by these two axes. FIG. 4 is a diagram illustrating an example of the method (B) of designating the movement plane according to the present embodiment.

In an example, the movement plane acquisition unit 111 displays, on the display 701, a check box for selection of two axes (movement axes) and a field for input of rotation angle around each axis, for each of the three coordinate axes (operation target axes) x, y, z. In this example, an x-y' plane formed by rotating the x-y plane by 30 degrees around the x axis is designated as a movement plane in the machine coordinate system, on the basis of the movement axes and the rotation angle designated by an operator.

The machine coordinate conversion unit 112 converts the coordinate value in the machine coordinate system into the position in the image of the machining area imaged by the camera 3, that is, the coordinate value in the two-dimensional image coordinate system in the display 701 and the touch panel 702. In this case, a three-dimensional coordinate value X in the machine coordinate system representing the position in the machining area is uniquely converted into a two-dimensional coordinate value u in the image coordinate system, like as u=PX. A transformation matrix P is set by the calibration performed in advance in a predetermined procedure, and stored as camera information in a storage unit (for example, RAM 13).

The image coordinate conversion unit 113 converts the coordinate value in the image coordinate system into the coordinate value on the movement plane in the machine coordinate system. A two-dimensional coordinate value is not converted into a unique three-dimensional coordinate value. When the conversion is limited to a coordinate on one movement plane, a two-dimensional coordinate value is converted into a two-dimensional coordinate value, and thus a machine coordinate value is determined uniquely.

The operation target position acquisition unit 114 acquires current position information in the machine coordinate system, on the operation target positioned in the machining area. Specifically, the operation target position acquisition unit 114 calculates the coordinate value of the operation target such as a tip of a tool in the machine coordinate system, on the basis of the position feedback of respective axes acquired from the machine tool 2. It is noted that a portion of the operation target is set in advance, and information indicating the correspondence relation between a coordinate value of the operation target and position feedback of respective axes is stored in the storage unit.

The operation icon display unit 115 superimposes and displays the operation icon on the image of the machining area, at the coordinate in the image coordinate system of the display 701 corresponding to the position information on the operation target. The operation icon serves as a start point of the slide operation performed by an operator on the touch panel 702. That is, an operator touches the operation icon, and then performs a slide operation to the intended position to which the operation target is to be moved.

After the operation icon is touched by the operator, the slide position acquisition unit 116 acquires the destination of the slide position in the slide operation. In the present embodiment, the slide position acquisition unit 116 acquires the end position of the slide operation as a slide position. The slide position acquisition unit 116 may further acquire the period of time from the start position to the end position of the slide operation, by a method such as of calculating a difference in time information or measuring the period of time with a timer. At this time, the slide position acquisition unit 116 may display the coordinate value obtained by converting the slide position in the image coordinate system into the machine coordinate system, according to the movement of the operation icon.

Figure 5:
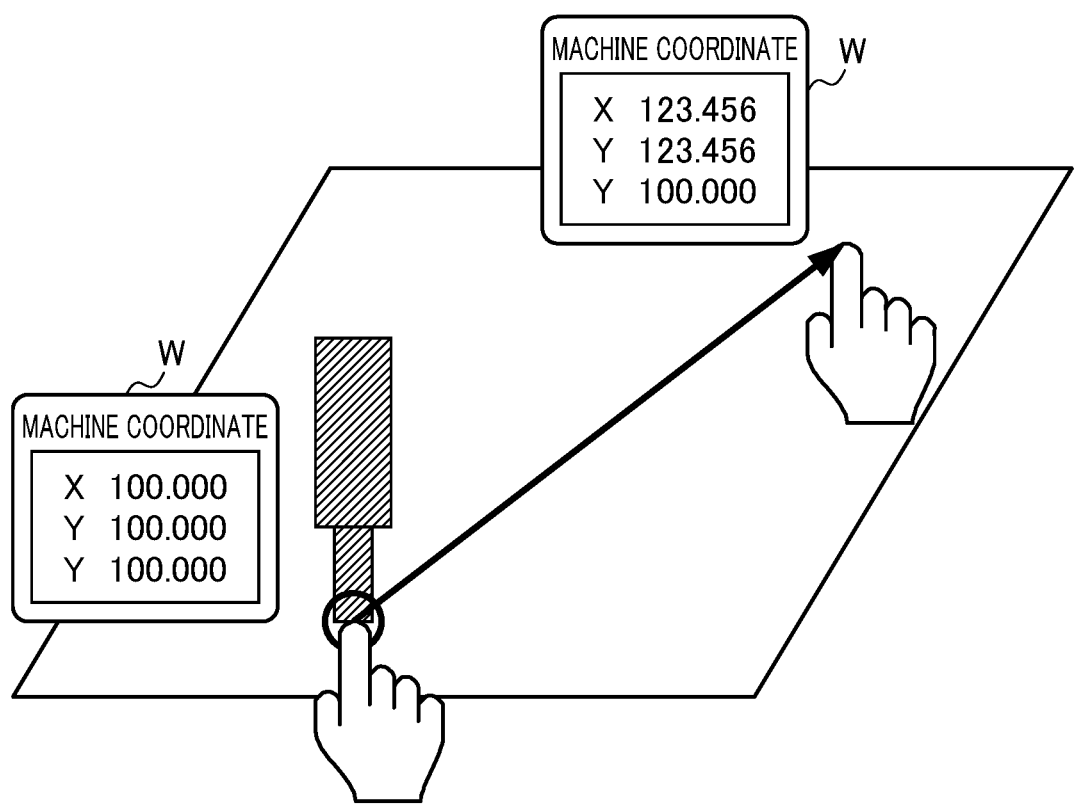
FIG. 5 is a diagram illustrating a display example of coordinate values in response to a slide operation according to the first embodiment.

FIG. 5 is a diagram illustrating a display example of coordinate values according to the slide operation according to the present embodiment. The coordinate value in the image coordinate system of the slide position which varies according to the slide operation is converted into the coordinate value in the machine coordinate system by the image coordinate conversion unit 113. Upon acquiring the slide position, the slide position acquisition unit 116 draws a window W for representing the machine coordinate after conversion, in the vicinity of the slide position or other position.

The window W for representing the machine coordinate may be drawn at a predetermined position on the display 701, or may be moved in synchronization with the slide position. Alternatively, the window W may be moved upon the touch operation performed by an operator, after the completion of the slide operation.

The movement amount calculation unit 117 calculates the movement amounts of respective axes for the instruction given to the machine tool 2 to move the operation target to the converted coordinate, on the basis of the coordinate obtained by converting the slide position in the image coordinate system into the machine coordinate system. At this time, the movement amount calculation unit 117 calculates the movement amounts of respective axes required to move the operation target in the machine coordinate system from the start position to the end position, regardless of the trace in the slide operation.

The axial movement unit 118 gives the machine tool 2 the instruction to actually move the operation target, on the basis of the calculated movement amounts of the respective axes. At this time, the axial movement unit 118 may move the operation target for the period of time equivalent to the operation time acquired by the slide position acquisition unit 116.

Figure 6:
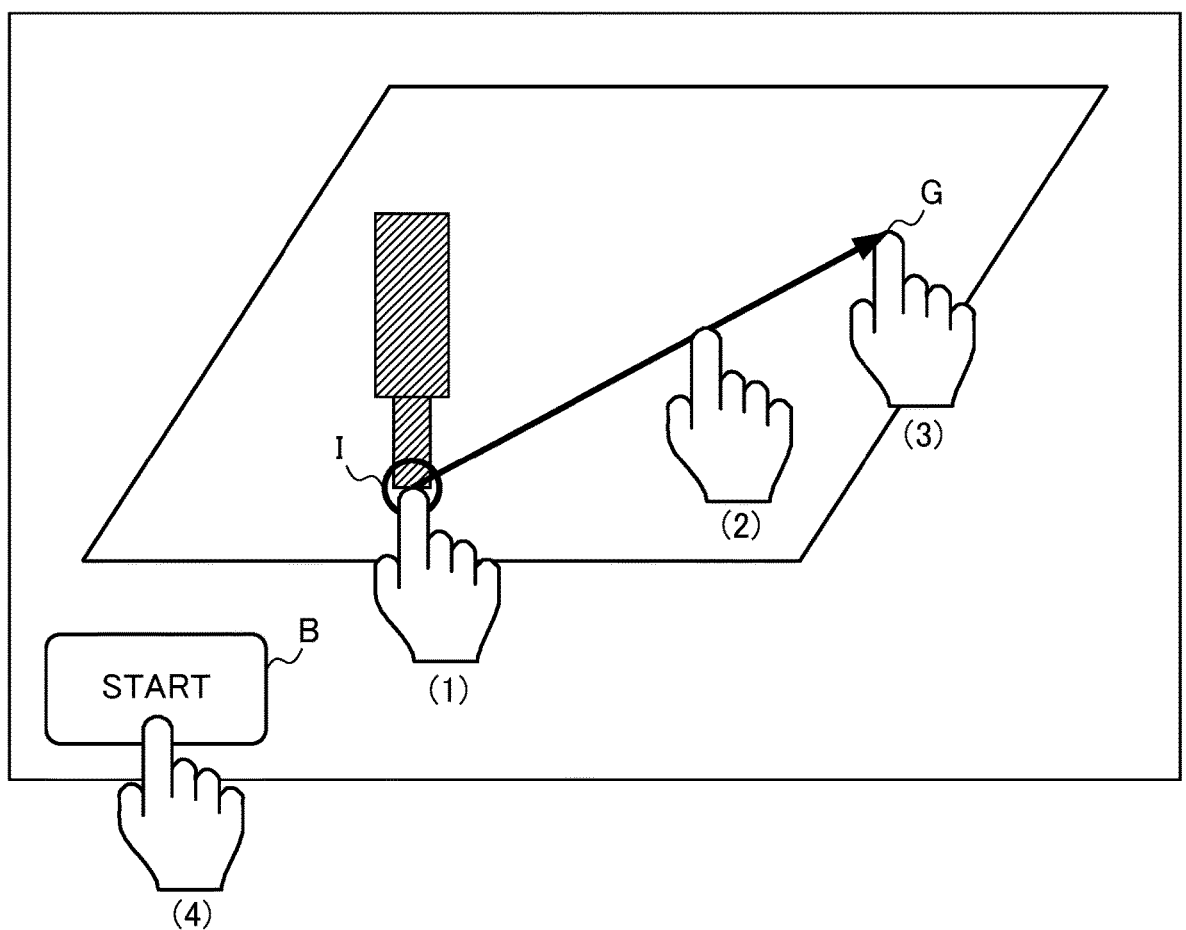
FIG. 6 is a diagram illustrating an example of an operation procedure performed by an operator according to the first embodiment.

FIG. 6 is a diagram illustrating an example of the operation procedure to be performed by an operator according to the present embodiment. In this example, after the destination of the operation target is determined in the slide operation, the actual axial movement is started in response to the movement start instruction given by the operator.

The operator performs an operation (1) of touching the operation icon I with his or her finger on the touch panel 702, and then an operation (2) of the slide operation to an intended position G on the image of the machining area. In this case, an arrow or the like may be displayed from the operation icon corresponding to the start position of the slide operation to the current slide position.

When the operator performs an operation (3) of finishing the slide operation by taking the finger off from the touch panel 702, the end position of the slide operation and the period of time spent for the slide operation are saved. When the end position of the slide operation is converted into the coordinate value in the machine coordinate system, and the movement amounts of the respective axes are then calculated, a start button B is enabled. When the operator performs an operation (4) of touching the start button B, the axial movement unit 118 moves the operation target for the saved time.

It is noted that the trigger to perform the actual axial movement is not limited to this example. In another example, the axial movement unit 118 may automatically start to move the operation target after a predetermined time passing after the completion of the slide operation and the acquisition of the slide position.

According to the present embodiment, the slide operation is performed with respect to the icon representing the operation target on the image of the imaged machining area of the machine tool 2, whereby the numerical controller 1 moves the actual operation target to an intended position. At this time, the numerical controller 1 enables to uniquely convert the slide position in the image coordinate system into the machine coordinate system because the movement plane is designated. As a result, an operator of the machine tool 2 is able to intuitively operate the axes via the touch panel 702. Accordingly, the numerical controller 1 enables to reduce a burden on the operator when moving the axes of the machine tool 2.

The numerical controller 1 acquires the end position of the slide operation and calculates the movement amounts of the respective axes in the machine tool 2 from the start position to the end position, thereby enabling to move the operation target to the intended position along a suitable path (for example, the shortest path) regardless of the trace of the slide operation The numerical controller 1 measures the period of time spent for the slide operation, thereby enabling to adjust the period of time to be spent for the actual movement of the operation target on the basis of the measured period of time. Accordingly, the operator is able to move the operation target at a desired speed.

The numerical controller 1 accepts the selection input of the movement plane out of a plurality of candidates. This enables to simplify the operation by an operator, and further allows an operator to easily determine the movement plane. Alternatively, the numerical controller 1 accepts the selection of two axes out of the three-dimensional coordinate axes in the machining area and the input of the rotation angle around each axis of the plane determined by the two selected axes. This allows detailed setting of the movement plane, and improves convenience.

The numerical controller 1 displays the corresponding coordinate value in the machine coordinate system according to the slide operation. This enhances the accuracy in the slide operation by the operator, and thus improves convenience.

Second Embodiment

The second embodiment of the present invention will be described below. It is noted that the same reference numerals are given to the same configurations as those of the first embodiment, and the descriptions thereof will be omitted or simplified. The present embodiment differs from the first embodiment in the functions of the slide position acquisition unit 116, the movement amount calculation unit 117, and the axial movement unit 118.

The slide position acquisition unit 116 periodically acquires the slide position from the start to the end of the slide operation. The slide position acquisition unit 116 further acquires the period of time until the slide operation reaches each slide position, by a method of, for example, calculating the difference in time information or measuring the period of time with a timer. Alternatively, the slide position acquisition unit 116 may calculate the period of time until the slide operation reaches each slide position, on the basis of the number of slide positions periodically acquired and the acquisition cycle of the slide position designated in advance. In an example case where, when the slide positions are acquired at a constant cycle of 10 milliseconds, the acquisition number of the slide positions from the acquisition start to the acquisition end is 1000, the period of time from the start to the end of the slide operation is obtained by the formula: 10 milliseconds×1000=10 seconds. As in the first embodiment, the slide position acquisition unit 116 may display the coordinate value obtained by converting the slide position in the image coordinate system into the machine coordinate system, according to the slide operation.

The movement amount calculation unit 117 acquires the coordinate values of the slide positions converted into the machine coordinate system in time series from the start to the end of the slide operation, and calculates the movement amounts of the respective axes required to move the operation target sequentially along these coordinates. The movement amount calculation unit 117 calculates the movement amounts of the respective axes required to move the operation target along the path obtained by interpolating with a curve the plurality of coordinate values acquired in time series. The movement amount calculation unit 117 further updates the curve for interpolation every time a new coordinate value is acquired, whereby the operation target is enabled to be moved smoothly.

The axial movement unit 118 moves the operation target for the period of time equivalent to the period of time spent from the start to the end of the slide operation. The axial movement unit 118 starts to move the operation target after a predetermined time, for example, several cycles after the start of the slide operation by the operator. That is, after a predetermined time passing after the acquisition of the slide position for each cycle, the operation target starts to be moved to the coordinate in the machine coordinate system corresponding to the slide position. As a result, the operation target is accordingly moved with a delay of a predetermined time from the slide operation.

Figure 7:
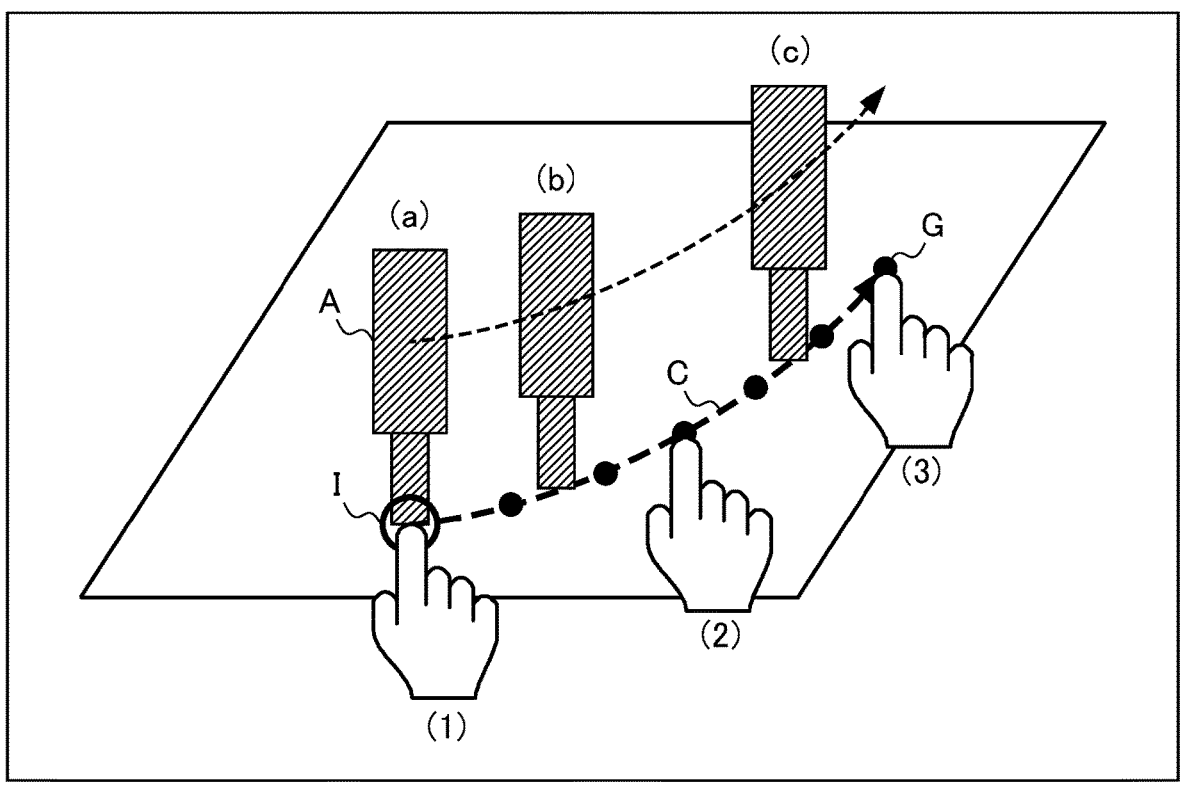
FIG. 7 is a diagram illustrating an example of an operation procedure performed by an operator according to a second embodiment.

FIG. 7 is a diagram illustrating an example of the operation procedure performed by an operator according to the present embodiment. In this example, the axial movement is automatically performed with respect to the operation target in synchronization with the slide operation so as to follow the path in the slide operation.

The operator performs the operation (1) of touching the operation icon I with his or her finger on the touch panel 702, and the operation (2) of the slide operation to the intended position G on the image of the machining area. During the period of time from the start to the end of the slide operation, the slide positions are periodically detected, and the coordinate values of the slide positions converted into the machine coordinate system and a curve C obtained by interpolating these coordinate values are saved.

The axial movement along the saved curve C is started after a predetermined time passing after the start of the slide operation. The operation target A which has started to move from a position (a) reaches a position (b) at the time when the slide position is under the operation (2), and further reaches a position (c) at the time when the slide position is under the operation (3). When the operator performs the operation (3) of finishing the slide operation by taking the finger off from the touch panel 702, the operation target A reaches, after a predetermined time, the coordinate in the machine coordinate system corresponding to the end position G of the slide operation, and finishes the movement.

According to the present embodiment, the numerical controller 1 periodically acquires the slide positions from the start to the end of the slide operation, and moves the operation target along the trace in the slide operation. Therefore, the numerical controller 1 is able to move the operation target along the path requested by an operator. The numerical controller 1 interposes the coordinate group on the movement path with a curve, thereby enabling to naturally move the operation target.

The numerical controller 1 moves the operation target at the same speed as that in the slide operation with a predetermined delay from the slide operation. Therefore, the numerical controller 1 is able to move the operation target in synchronization with the slide operation performed by the operator. Accordingly, the operator is able to move the operation target to the intended position while checking the actual movement of the operation target.

Although the embodiments of the present invention have been described so far, the present invention is not limited to the above-described embodiments. The effects described in the embodiments are listed merely as the most preferable effects produced by the present invention. The effects produced by the present invention are not limited to those described in the above embodiments.

In the above-described embodiments, the numerical controller 1 moves the operation target in a two-dimensional movement plane. Alternatively, the numerical controller 1 may move the operation target with respect only to a single axis (for example, x axis, y axis, z axis) instead of a movement plane.

In the above-described embodiments, the operation icon does not move during the slide operation performed by the operator. Alternatively, a so-called drag operation, in which the operation icon itself moves, may be used as a slide operation.

The targets to be controlled by the numerical controller 1 are not limited to specific machine tools. The above-described embodiments are applicable to various types of machine tools including a cutting machine, a laser machine, and an electric discharge machine.

A control method performed by the numerical controller 1 is realized by software. In the case where the method is realized by software, programs included in the software are installed in a computer. The programs may be distributed to a user by being stored in a removable medium, or may be distributed by being downloaded to a user's computer via a network.

EXPLANATION OF REFERENCE NUMERALS

1 NUMERICAL CONTROLLER (CONTROLLER)
2 MACHINE TOOL
3 CAMERA
11 CPU
70 DISPLAY/MDI UNIT
111 MOVEMENT PLANE ACQUISITION UNIT
112 MACHINE COORDINATE CONVERSION UNIT
113 IMAGE COORDINATE CONVERSION UNIT
114 OPERATION TARGET POSITION ACQUISITION UNIT
115 OPERATION ICON DISPLAY UNIT
116 SLIDE POSITION ACQUISITION UNIT
117 MOVEMENT AMOUNT CALCULATION UNIT
118 AXIAL MOVEMENT UNIT
701 DISPLAY
702 TOUCH PANEL

What is claimed is:

1. A controller comprising:
a movement plane acquisition unit configured to accept designation of a movement plane on which an operation target is to be moved in a three-dimensional machine coordinate system indicating a position in a machining area of a machine tool;
a machine coordinate conversion unit configured to convert a coordinate value in the machine coordinate system into a two-dimensional image coordinate system indicating a position in an image of the machining area imaged by a camera;
an image coordinate conversion unit configured to convert a coordinate value in the image coordinate system into a coordinate value on the movement plane in the machine coordinate system;
an operation target position acquisition unit configured to acquire current position information on the operation target in the machine coordinate system;
an operation icon display unit configured to superimpose and display an operation icon at a coordinate in the image coordinate system corresponding to the position information;
a slide position acquisition unit configured to acquire a destination of a slide position in a slide operation after the operation icon is touched by an operator;
a movement amount calculation unit configured to calculate an axial movement amount of the machine tool, on a basis of the coordinate obtained by converting the slide position in the image coordinate system into the machine coordinate system; and
an axial movement unit configured to move the operation target according to the calculated axial movement amount.

2. The controller according to claim 1, wherein
the slide position acquisition unit acquires an end position of the slide operation as the slide position, and
the movement amount calculation unit calculates the axial movement amount of the machine tool required to move the operation target to a coordinate of the end position in the machine coordinate system.

3. The controller according to claim 1, wherein
the slide position acquisition unit periodically acquires the slide positions from a start to an end of the slide operation, and
the movement amount calculation unit acquires in time series the coordinate values of the slide positions converted into the machine coordinate system, and calculates the axial movement amounts required to move the operation target sequentially along the coordinate values.

4. The controller according to claim 3, wherein
the movement amount calculation unit calculates the axial movement amounts required to move the operation target along a path obtained by interpolating the coordinate values acquired in time series with a curve.

5. The controller according to claim 3, wherein
the slide position acquisition unit calculates a period of time until the slide operation reaches each of the slide positions, on a basis of a number of the slide positions acquired periodically from the start to the end of the slide operation, and an acquisition cycle of the slide positions designated in advance, and
the axial movement unit moves the operation target for a period of time equivalent to the calculated period of time.

6. The controller according to claim 1, wherein
the slide position acquisition unit acquires a period of time until the slide operation reaches the slide position, and
the axial movement unit moves the operation target for a period of time equivalent to the calculated period of time.

7. The controller according to claim 6, wherein
the axial movement unit starts to move the operation target after a predetermined time passing after acquisition of the slide position.

8. The controller according to claim 1, wherein
the movement plane acquisition unit accepts selection input of the movement plane from an image illustrating a plurality of preset candidates.

9. The controller according to claim 1, wherein
the movement plane acquisition unit accepts designation of the movement plane, through selection of two axes out of three-dimensional coordinate axes in the machining area and input of a rotation angle around each axis of a plane determined by the two selected axes.

10. The controller according to claim 1, wherein
the slide position acquisition unit displays the coordinate value obtained by converting the slide position in the image coordinate system into the machine coordinate system, according to the slide operation.

11. A control method to be executed by a computer, the control method comprising:
a movement plane acquiring step of accepting designation of a movement plane on which an operation target is to be moved in a three-dimensional machine coordinate system indicating a position in a machining area of a machine tool;

a machine coordinate converting step of converting a coordinate value in the machine coordinate system into a two-dimensional image coordinate system indicating a position in an image of the machining area imaged by a camera;

an image coordinate converting step of converting a coordinate value in the image coordinate system into a coordinate value on the movement plane in the machine coordinate system;

an operation target position acquiring step of acquiring current position information on the operation target in the machine coordinate system;

an operation icon displaying step of superimposing and displaying an operation icon at a coordinate in the image coordinate system corresponding to the position information;

a slide position acquiring step of acquiring a destination of a slide position in a slide operation after the operation icon is touched by an operator;

a movement amount calculating step of calculating an axial movement amount of the machine tool, on a basis of the coordinate obtained by converting the slide position in the image coordinate system into the machine coordinate system; and an axis moving step of moving the operation target according to the calculated axial movement amount.

12. A non-transitory computer-readable medium for storing a control program, the control program for making a computer execute the steps of:

a movement plane acquiring step of accepting designation of a movement plane on which an operation target is to be moved in a three-dimensional machine coordinate system indicating a position in a machining area of a machine tool;

a machine coordinate converting step of converting a coordinate value in the machine coordinate system into a two-dimensional image coordinate system indicating a position in an image of the machining area imaged by a camera;

an image coordinate converting step of converting a coordinate value in the image coordinate system into a coordinate value on the movement plane in the machine coordinate system;

an operation target position acquiring step of acquiring current position information on the operation target in the machine coordinate system;

an operation icon displaying step of superimposing and displaying an operation icon at a coordinate in the image coordinate system corresponding to the position information;

a slide position acquiring step of acquiring a destination of a slide position in a slide operation after the operation icon is touched by an operator;

a movement amount calculating step of calculating an axial movement amount of the machine tool, on a basis of the coordinate obtained by converting the slide position in the image coordinate system into the machine coordinate system; and an axis moving step of moving the operation target according to the calculated axial movement amount.

* * * * *